Patented Aug. 19, 1952

2,607,781

UNITED STATES PATENT OFFICE 2,607,781

PROCESS FOR PREPARING ALKYL ISODE-HYDROACETATES EMPLOYING SULFUR TRIOXIDE

James M. Straley and Brice S. Wininger, Kingsport, Tenn., assignors to Eastman Kodak Company, Rochester, N. Y., a corporation of New Jersey No Drawing. Application March 29, 1951, Serial No. 218,268

20 Claims. (Cl. 260—344)

1

This invention relates to the preparation of esters of isodehydroacetic acid by an improved process employing sulfur trioxide as the condensing agent.

It is known that alkyl isodehydroacetates may be prepared by condensing alkyl acetoacetates in the presence of an acid condensing agent at room temperature or lower temperatures and under ordinary atmospheric pressure. Thus, it is known that ethyl isodehydroacetate may be prepared by introducing anhydrous hydrogen chloride into cold ethyl acetoacetate at temperatures near 0° C. and allowing the mixture to stand for a long period of time on the order of a couple of weeks at room temperatures with usually an additional cooling to near 0° C., accompanied by the introduction of more hydrogen chloride. However, the yields obtained by such a process rarely exceed 50 percent until at least two weeks have elapsed.

It is also known that similar results may be obtained when concentrated sulfuric acid is employed as the condensing agent, the other conditions being substantially the same as described for the utilization of hydrogen chloride. The extensive periods of time for accomplishing the condensation reaction under such conditions are necessary in order to obtain worthwhile yields. During the preparation of alkyl isodehydroacetates, the formation of water during the condensation reaction together with the presence of the acidic condensation agent, create a condition which is normally conducive of hydrolysis. Hydrolysis and other side reactions are obviously undesired and cause the production of contaminating by-products. Under the conditions described in the prior art, ethyl isodehydroacetate has been prepared by condensing a solution consisting of six equivalents (3 mols) of concentrated sulfuric acid per mol of ethyl acetoacetate at room temperature (about 25° C.) for 10 to 14 days with a consequent 82 percent yield of an approximately half-and-half mixture of ethyl isodehydroacetate and isodehydroacetic acid. Since the free acid is not a desired product of our process, such a yield of only 41 percent of the ester is not very satisfactory. The free acid obtained is difficult to esterify, and its formation is therefore not desired. Upon further investigation of the use of sulfuric acid as the condensing agent, it was found that the side reactions involved at increased temperatures and various concentrations resulted in so many undesirable by-products that satisfactory yields of alkyl isodehydroacetates were not obtainable even though increased rates of reaction did accompany the increase in the temperatures. It was also found that when the temperatures of the condensation were raised, the over-all yield of ethyl isodehydroacetate and iso-

2 dehydroacetic acid was lowered. Further, it was found that the proportion of this yield which was ester also was diminished as the temperature was increased.

In U. S. Patent 2,529,917 dated November 14, 1950, a process is described for the preparation of esters of isodehydroacetic acid employing hydrogen chloride as the condensing agent at temperatures of from 25° to 100° C., and conducting the reaction in a closed vessel under autogenous pressure. Judging by the yields obtained, the use of hydrogen chloride seems superior to the other methods described in the prior art, but on a commercial scale, such a process imposes serious problems of handling and corrosion. Furthermore, anhydrous hydrogen chloride is quite expensive and there is apparently little likelihood of inexpensive recovery of it. Sulfuric acid and oleum are cheap but the yields obtained by their use as described in the prior art are either low, or the desired esters formed are contaminated with considerable quantities of free isodehydroacetic acid which cannot be economically converted to the esters desired.

We have now discovered a process which is not encumbered by any of these disadvantages. We have found that sulfur trioxide can be used to promote the self-condensation of esters of acetoacetic acid to form the correponding esters of isodehydroacetic acid. Anhydrous sulfur trioxide is now available commercially at a reasonable price and its use is not accompanied by inordinate corrosion or handling problems. Furthermore, by using anhydrous sulfur trioxide, free isodehydroacetic acid is formed in quantities which are relatively insignificant from a manufacturing viewpoint; that is, it is not formed in amounts sufficient to result in the solid complex which is an undesirable by-product when sulfuric acid is employed.

The principal reaction which takes place in accordance with our invention can be represented as follows:

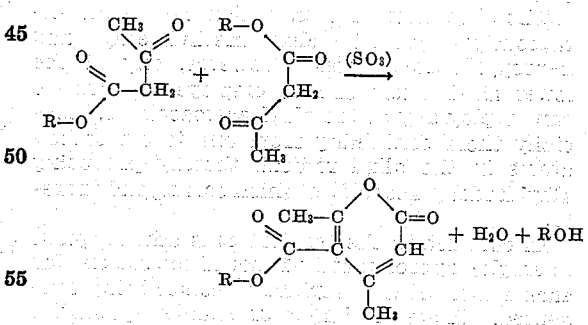

wherein R represents an aky radical,

We have further found that the use of an anhydrous solvent which does not interfere with the course of the condensation reaction is advantageous in the conduct of this reaction. Moreover, it has been discovered that when lower aliphatic alcohols are employed as such solvents that their use permits the employment of higher temperatures without lowering the yield. While alcohol is formed in the reaction, as indicated in the above chemical equation, the addition of an alcohol to the reaction mixture actually increases the yields of the desired product. This is unexpected inasmuch as the law of mass-action would indicate that the presence of an alcohol would tend to cause the reaction to reverse itself.

It is an object of our invention to provide an improved process for the manufacture of alkyl esters of isodehydroacetic acid. A further object of our invention is to provide a superior condensing agent for employment in the condensation of alkyl esters of acetoacetic acid to form the alkyl esters of isodehydroacetic acid. Another object of our invention is to provide effective solvents which serve as advantageous reaction mediums for the conduct of the condensation reaction. Other objects will become apparent hereinafter.

In practicing our invention, we have found that while temperatures at least as high as 80° C. may be used, it is more advantageous to use temperatures no higher than room temperatures. It is preferred to employ temperatures, especially during the mixing of the components of the reaction mixture, which are in the vicinity of 0° C. or lower. The lowest temperature employable has not been determined but it is clearly below −20° C. inasmuch as the latter temperature has been employed satisfactorily.

Although it is not necessary for the reaction to be conducted in a solvent, the use of certain solvents is advantageous as has been explained above. Such solvents can include the aromatic hydrocarbons such as benzene, toluene, xylene, etc., or halogenated aliphatic hydrocarbons. However, the preferred solvents are aliphatic alcohols such as ethanol, isopropanol, butanol, hexanol, etc. Generally, such alcohols which can be advantageously employed are those alcohols which have the formula $C_nH_{2n+1}OH$ where $n$ is an integer of from 1 to 6. It is important that these solvents be substantially free of water.

Although the sequence and method of bringing the components of the reaction mixture together can be varied considerably, it is preferred to add the sulfur trioxide to the acetoacetic ester which has been dissolved in a solvent which does not interfere with the course of the condensation thereof, if such a solvent is being employed.

The alkyl acetoacetates which can be advantageously employed include methyl, ethyl, and n-propyl acetoacetates. However, any of the lower alkyl esters can be employed. Thus we can employ any of the alkyl acetoacetates, especially those containing from one to six carbon atoms in the alkyl radical, thereby producing alkyl isodehydroacetates which correspond thereto.

In conducting the reaction it is advantageous to employ approximately 1 mol of the solvent for each 2 mols of the alkyl acetoacetate being condensed. However, larger or smaller quantities of the solvent can be employed. As has been pointed out above, the condensation reaction can be employed without any solvent. The quantity of sulfur trioxide which can be advantageously employed may be varied considerably. However, one mol of sulfur trioxide per mol of alkyl acetoacetate is an advantageous proportion. Higher and lower proportions can also be employed. It is advantageous to dissolve the sulfur trioxide in a solvent such as a liquid hydrocarbon, which can be either aliphatic or aromatic, and halogenated derivatives thereof. Examples of such solvents include benzene, toluene, xylene, carbon tetrachloride, etc. Such solvents also serve to separate the alkyl isodehydroacetate as an organic layer from the reaction mixture. When such solvents are employed, it is advantageous to dissolve the sulfur trioxide therein prior to its introduction into the alkyl acetoacetate which is to be condensed; however, the sulfur trioxide can be introduced directly without previous dissolution thereof. The hydrocarbon solvents can be introduced into the reaction mixture either at once or after the condensation is completed or not at all.

During the introduction of the sulfur trioxide into the alkyl acetoacetate (or vice versa), it is advantageous to maintain the temperature of the mixture below 20° C. Even more advantageously, the temperature can be maintained at around 0° C. However, higher temperatures can also be employed. After the admixture of the components of the reaction mixture has been completed, the temperature may be permitted to rise to room temperature or it may be raised to an elevated temperature of about 40° C. Higher temperatures than 40° C. can also be employed. However, it is usually advantageous to maintain the temperature during the reaction period at 25° C. or lower.

The admixing operation should be conducted slowly over a period of time which permits the maintenance of the temperature within the desired range. This period of time obviously depends upon the cooling means available. Any length of time from a few minutes to several hours may be employed for the admixing operation; however, two hours will normally be sufficient. Upon completion of the admixing of the components of the reaction mixture, the reaction mixture can be allowed to stand for from a few hours to an almost indefinite period of time. Advantageously, from 4 to 60 hours can be employed, depending upon the other conditions under which the reaction is conducted. Ordinarily, periods of time employed need not exceed 24 hours. When the reaction is conducted at or above room temperatures, the period of time should be reduced to avoid undue formation of undesirable products; thus 12 hours under some such circumstances is frequently sufficient.

Upon substantial completion of the condensation, the alkyl isodehydroacetate can be separated by pouring the reaction mixture onto ice or into cold water and adding a nonwater-miscible solvent such as the hydrocarbons referred to above if they are not already present. The organic layer which forms contains the desired product which can then be separated out by distillation and can be further purified by any suitable means. Other methods of separating the product from the reaction mixture are also clearly possible and can be applied.

The following examples will serve to further illustrate the manner of practicing our invention; all parts are parts by weight.

Example 1

A solution of 50 parts of ethanol in 260 parts (2 mols) of ethyl acetoacetate was prepared. Keeping the admixing temperature below 5° C., 160 parts (2 mols) of $SO_3$ was fed in with good agitation during a period of 2 hours. The reaction mixture was then allowed to stand 12 hours at room temperature. It was then poured onto ice and 400 parts of benzene was added. The organic layer which formed was separated off and distilled. There was thus obtained 87 parts of ethyl isodehydroacetate which represents a 56% yield based on the amount of ethyl acetoacetate which reacted, there being 51 parts of the latter compound which remained unchanged in the reaction product. The ethyl isodehydroacetate boiled at 115° to 130° C. at 2 mm. of Hg pressure; it can be further purified by redistillation, fractionation or any other suitable means, if desired.

Example 2

The procedure in Example 1 was repeated exactly except that the admixing temperature was kept below −20° C. and the reaction mixture was allowed to stand at −5° C. to 0° C. There was thus obtained 91 parts of ethyl isodehydroacetate which represented a 60% yield; 61 parts of ethyl acetoacetate remained unchanged.

Example 3

The procedure of Example 1 was repeated exactly except that 80 parts of n-butanol was employed in place of the ethanol, the admixing temperature was kept at −5° C. to 0° C., and the reaction mixture was allowed to stand 60 hours at 0° C. There was thus obtained 95 parts of ethyl isodehydroacetate which represented a 64% yield; 65 parts of ethyl acetoacetate remained unchanged.

Isopropanol has also been employed in accordance with the procedure set forth in the above example whereby it replaces the n-butanol.

Example 4

The procedure of Example 1 was repeated exactly except that 350 parts of benzene was incorporated into the ethanol solution prior to the introduction of $SO_3$, the admixing temperature was kept below 10° C., the reaction mixture was allowed to stand 4 hours at 40° C., and no benzene was added after pouring onto ice. There was thus obtained 92 parts of ethyl isodehydroacetic acid which represented a 60% yield; 57 parts of ethyl acetoacetate remained unchanged.

Example 6 shows that adding the $SO_3$ to the ethyl acetoacetate solution as in Example 1 is more advantageous than the modified reverse procedure of Example 6 wherein the ethyl acetoacetate was added to a solution of $SO_3$.

Example 7

The procedure of Example 1 was repeated exactly except that the $SO_3$ was first dissolved in 260 parts of carbon tetrachloride prior to the addition thereof to the ethyl acetoacetate solution, the admixing temperature was kept below 20° C., the reaction mixture was allowed to stand 20 hours at 5° C., and no benzene was added after pouring onto ice. There was thus obtained 112 parts of ethyl isodehydroacetate which represented a 70% yield; 45 parts of ethyl acetoacetate remained unchanged.

Example 7 shows that the $SO_3$ in the form of a solution can be advantageously added to the ethyl acetoacetate.

Example 8

The procedure of Example 1 was repeated exactly except that no ethanol was employed, and the reaction mixture was allowed to stand 40 hours at 5° C. There was thus obtained 61 parts of ethyl isodehydroacetate which represented a 34% yield; 28 parts of ethyl acetoacetate remained unchanged.

Example 8 shows that it is more advantageous to employ a solvent for the ethyl acetoacetate being condensed as in Example 1 than to omit such a solvent as in Example 8.

Example 9

The procedure of Example 1 was repeated exactly except that an approximately equivalent molecular quantity (230 parts) of methyl acetoacetate was employed without dissolution in ethanol (no solvent for the methyl acetoacetate being employed), the $SO_3$ was dissolved in 260 parts of carbon tetrachloride prior to the addition thereof to the methyl acetoacetate, the admixing temperature was kept below 20° C., the reaction mixture was allowed to stand 20 hours at 5° C., and no benzene was added after pouring onto ice. There was thus obtained 61 parts of methyl isodehydroacetate which represented a yield of 40%; 35 parts of methyl acetoacetate remained unchanged. The methyl isodehydroacetate boiled at 115° to 120° C. at 2 mm. of Hg pressure and had a melting point at 65°–66° C. It can be further purified by redistillation, fractionation, or any other suitable means if desired.

Example 9 shows that the omission of a solvent for the acetoacetic ester being condensed results in a less advantageous yield than when such a solvent is employed as in Example 7 or 10.

Example 10

The procedure of Example 9 was repeated exactly except that the methyl acetoacetate was dissolved in 50 parts of ethanol prior to the addition of the $SO_3$ dissolved in carbon tetrachloride. There was thus obtained 84 parts of methyl isodehydroacetate (which boiled at 150°–160° C. at 10 mm. of Hg pressure) and which represented a yield of 56%; 40 parts of methyl acetoacetate remained unchanged.

Example 10 represents an equivalent procedure to that of Example 7 except for the use of the methyl instead of the ethyl ester. As in Example 7, Example 10 shows that the $SO_3$ in the form of a solution can be advantageously added to methyl acetoacetate.

The methods disclosed in the above examples are clearly subject to many modifications such as in the proportion of sulfur trioxide to alkyl acetoacetate, the proportion of solvent employed, the temperatures, reaction times, etc.

What we claim as our invention is:

1. A process for preparing an alkyl isodehydroacetate comprising condensing an alkyl acetoacetate containing from 1 to 6 carbon atoms in the alkyl group at a temperature of from about −20° to about 40° C. in the presence of sulfur trioxide.

2. A process as defined in claim 1 wherein the alkyl group is methyl.

3. A process as defined in claim 1 wherein the alkyl group is ethyl.

4. A process for preparing ethyl isodehydroacetate comprising condensing ethyl acetoacetate at a temperature of from about —20° to about 40° C. in the presence of sulfur trioxide and an alcohol having the formula $C_nH_{2n+1}OH$ where $n$ represents an integer from 1 to 6.

5. A process as defined in claim 4 wherein the alcohol is ethanol.

6. A process as defined in claim 5 wherein the initial mol ratio of sulfur trioxide to ethyl acetoacetate is about unity.

7. A process as defined in claim 6 wherein the sulfur trioxide is added to the ethyl acetoacetate solution.

8. A process as defined in claim 7 wherein the sulfur trioxide is dissolved in a solvent selected from the group consisting of aromatic and aliphatic liquid hydrocarbons and chlorinated hydrocarbons prior to its addition to the ethyl acetoacetate solution.

9. A process as defined in claim 8 wherein the sulfur trioxide solvent is carbon tetrachloride.

10. A process as defined in claim 9 wherein the temperature is maintained below about 20° C. while adding the sulfur trioxide solution.

11. A process for preparing an alkyl isodehydroacetate comprising adding sulfur trioxide at a temperature of from about —20° to about 20° C. to a solution of an alkyl acetoacetate containing from 1 to 6 carbon atoms in the alkyl group dissolved in a solvent which does not interfere with the course of the condensation reaction, and then allowing the reaction to continue for from about 4 to about 60 hours at a temperature of from about —10° to about 40° C.

12. A process for preparing an alkyl isodehydroacetate comprising adding sulfur trioxide to a solution in an alcohol having the formula $C_nH_{2n+1}OH$ wherein $n$ is an integer from 1 to 6 of an alkyl acetoacetate containing from 1 to 6 carbon atoms in the alkyl group at a temperature of from about —20° to about 20° C. and then allowing the reaction to continue for from about 4 to about 60 hours at a temperature of from about —10° to about 40° C.

13. A process as defined in claim 12 wherein the alkyl group is ethyl.

14. A process as defined in claim 13 wherein the sulfur trioxide is dissolved in a solvent selected from the group consisting of aromatic and aliphatic liquid hydrocarbons and chlorinated hydrocarbons prior to its addition to the ethyl acetoacetate solution.

15. A process as defined in claim 14 wherein the alcohol is ethanol.

16. A process as defined in claim 15 wherein the sulfur trioxide solvent is carbon tetrachloride.

17. A process as defined in claim 16 wherein the initial mol ratio of sulfur trioxide to ethyl acetoacetate is about unity.

18. A process for preparing methyl isodehydroacetate comprising adding sulfur trioxide to a solution in an alcohol having the formula $C_nH_{2n+1}OH$ wherein $n$ is an integer from 1 to 6 of methyl acetoacetate at a temperature of from about —20° to about 20° C. and then allowing the reaction to continue for about 4 to about 60 hours at a temperature of from about —10° to about 40° C.

19. A process as defined in claim 18 wherein the sulfur trioxide is dissolved in a solvent selected from the group consisting of aromatic and aliphatic liquid hydrocarbons and chlorinated hydrocarbons prior to its addition to the ethyl acetoacetate solution.

20. A process as defined in claim 19 wherein the alcohol is ethanol, the sulfur trioxide solvent is carbon tetrachloride and the mol ratio of sulfur trioxide to methyl acetoacetate is about unity.

JAMES M. STRALEY.
BRICE S. WININGER.

No references cited.